US005181326A

United States Patent [19]

Eberline

[11] Patent Number: 5,181,326

[45] Date of Patent: Jan. 26, 1993

[54] TOOL AND METHOD FOR INSTALLING TILE

[76] Inventor: Joseph Eberline, 611 El Placer Rd., Palm Springs, Calif. 92264

[21] Appl. No.: 813,116

[22] Filed: Dec. 23, 1991

[51] Int. Cl.[5] .............................................. G01B 3/30

[52] U.S. Cl. .............................. 33/527; 33/DIG. 20; 33/562; 33/464

[58] Field of Search ......... 33/562, 526, 527, DIG. 20, 33/464

[56] References Cited

U.S. PATENT DOCUMENTS

| | | | |
|---|---|---|---|
| 1,619,091 | 3/1927 | Rieser | 33/DIG. 20 X |
| 5,038,490 | 8/1991 | Armstrong | 33/DIG. 20 X |

FOREIGN PATENT DOCUMENTS

| | | | |
|---|---|---|---|
| 1961169 | 8/1970 | Fed. Rep. of Germany | 33/527 |
| 2185115 | 7/1987 | United Kingdom | 33/527 |

*Primary Examiner*—Harry N. Haroian

[57] ABSTRACT

Disclosed is a tool for marking tiles having a predetermined thickness, so that the tiles may be cut precisely to enable them to be placed adjacent each other and spaced apart a predetermined, uniform, distance corresponding to the thickness of a desired grouting thickness. The tool includes a generally flat, elongated, rectilinear bar having a pair of opposed ends, a pair of opposed sides, and generally flat top and bottom opposed faces. A plurality of different sized slide elements are selectively used with the bar depending of the desired thickness of the grouting. Individual ones of the slide elements are adapted to be carried by the bar and movable along the length of the bar between the ends and removed from the bar by sliding off an end. Each of said slide elements have a body member which is supported by the top face and has a pair of opposed arms extending along and bearing against the sides. The arms have a height less than the thickness of the tile. Each of the arms has a finger which extends beyond the bottom face and inwardly beneath the bottom face. The fingers are of an equal, predetermined thickness which facilitates marking the tile so that, upon installation, adjacent tiles may be spaced apart said predetermined, selected distance. A screw type fastener extends through the body which, upon tightening, has an end bearing against the top face for holding the slide element in a selected position along the bar. The tool includes a plate attached to an end of the bar which has a straight edge and which is movable to different angular positions relative to the bar. This allows cutting the tile at an angle to fit next to angular walls.

7 Claims, 6 Drawing Sheets

GROUT JOINT
WALL
WALL

CUT LINE
B
C
10
11
11a
12
14
18
22
24
26
29
30
32
34
36
38
40
40a
48
50a
50z
84
7a

CUT LINE
10a
11
12
14
16
18
26
28
29
30
32
34
36
38
40
40a
48
50a
60
62
66
70
76
78
80
84
9a

TOOL AND METHOD FOR INSTALLING TILE

BACKGROUND OF THE INVENTION

Field of the Invention

This invention relates to a tool used to mark tile, enabling the tile to be cut precisely to the required dimensions, so that, upon installation, a uniform grouting space will be provided between contiguous tiles.

Background Discussion

In installing tiles, the tiles are first secured to the central section of a floor and then tiles are cut to the correct size to fill the floor space nearby adjoining walls. A great deal of time is spent in measuring the dimensions of the tile sections to be cut from whole tiles. After cutting the tiles, the tile sections are placed next to the adjoining walls in the adjacent floor space and secured to the floor. It is desirable to cut the tiles into tile sections having precise dimensions so that the grouting space between adjacent tiles will be of a uniform thickness along the contiguous edges of the tiles.

As used herein, tile refers to any generally planer floor, ceiling or wall covering, usually having a rectangular configuration, frequently a square. Tiles include bricks having a thickness in excess of 4 inches, cinder blocks, wood panels, ceramic and vinyl flooring, etc. It may be made of ceramic, plastic, or other durable material, and may have a uniform or irregular thickness. Typically, the thickness of the tile is between $\frac{1}{8}$ and 8 inch.

SUMMARY OF THE INVENTION

It is the objective of this invention to provide a tool and method for cutting tiles quickly and accurately to provide a tile section which fits into a floor space nearby an adjoining wall, and provides between contiguous tiles, a uniform grouting space.

The tool of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include low cost manufacture, speed in measuring tiles for cutting, and improved quality of tile installation, specifically uniformity of grouting thickness.

The first feature of this invention is that the tool includes a rectilinear bar having a pair of opposed ends, a pair of opposed sides, and top and bottom opposed faces.

The second feature is a slide element carried by the bar and movable along the length of the bar between the ends of the bar. The slide element has a body member which is supported by the top face of the bar and has a pair of opposed arms extending along the sides of the bar. Optionally, the sides each have a groove along the length of the bar and each arm has a guide member which rides in a groove as the slide element slides along the bar.

The third feature is that each of the arms has a finger which extends beyond the bottom face, and each of the fingers has a predetermined thickness which facilitates marking and cutting the tile so that, upon installation, adjacent tiles shall be spaced apart a predetermined, selected distance. Preferably, the fingers extend inwardly beneath said bottom face and are of equal thickness.

The forth feature is fastener means for holding the slide element in a selected position along said bar.

The fifth feature is a plate attached to an end of the bar which has a straight edge and which is movable to different angular positions relative to the bar.

This invention also provides a method of using the tool for marking tiles having a predetermined thickness, so that the tiles may be cut precisely to enable them being placed adjacent each other and spaced apart a predetermined, selected distance. In accordance with this method, tiles are installed by (a) laying tiles in a central area of a surface to provide a space between the laid tiles and the adjoining wall which is less than the width of an individual tile, (b) using the tool, marking the tiles to be placed in said space so that said tiles may be cut precisely to enable the tiles to be placed adjacent each other and spaced apart a predetermined, selected distance, (c) placing the tool of the laid tiles so that an end of the tool abuts the adjoining wall and a first portion of the bar extends beyond the laid tiles and a second portion of the bar rest on the laid tiles, (d) moving the slide element along the bar so that the fingers engage an edge of the laid tiles and then securing the slide element in this position by manually tightening the fastening means, (e) placing the tool on a tile to be marked and cut in the same relative position as the tool was placed on the laid tile with the first portion of the bar resting on the tile to be marked and cut and the fingers engaging an edge of said tile, (f) with the tool in the position of step (e), marking the tile using the end of said first portion as an indicator, and (g) cutting said tile along the mark and installing the cut tile in said space, adjacent the laid tiles and spaced apart a predetermined, selected distance as determined by the thickness of said fingers.

DESCRIPTION OF THE DRAWING

The preferred embodiments of this invention, illustrating all its features, will now be discussed in detail. These embodiments depict the novel and non-obvious tool and method of this invention shown in the accompanying drawing, which is for illustrative purposes only. This drawing includes the following figures (FIGS.), with like numerals indicating like parts.

DETAILED DESCRIPTION OF THE PREFERRED EMBODIMENTS

Figures 1, 2, 3:
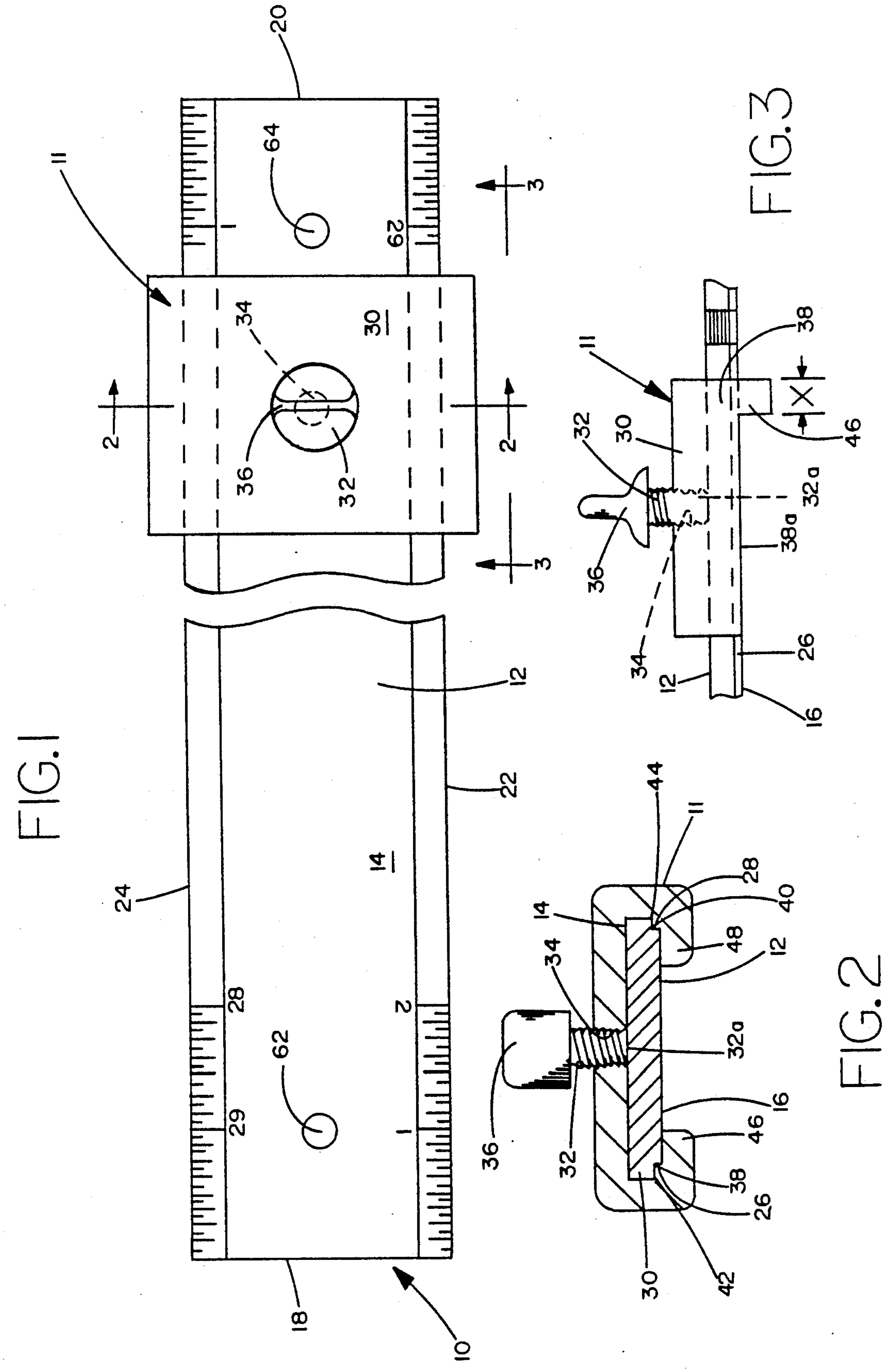
FIG. 1 is a plan view of the first embodiment of the tool of this invention.
FIG. 2 is cross-sectional view taken along line 2—2 of FIG. 1.
FIG. 3 is an end elevational view taken along line 3—3 of FIG. 1.

As best illustrated in FIGS. 1 through 3, the first embodiment of this invention, the tool 10, includes a slide 11 and an elongated, generally flat, rectilinear bar 12 which has a length typically ranging between 12 and 36 inches. Preferably, both the slide 11 and bar 12 are both made of metal such as. for example, plastic, steel or aluminium. When a metal bar is used, preferably the underside is coated with a material that prevents scratching the surface of the tile, such as, for example a fluorocarbon polymer, for example, a Teflon® material.

The bar 12 has a top face 14 and a bottom face 16; a left end 18 and right end 20 as viewed in FIG. 1; and left side 22 and right side 24 as viewed in FIG. 2. Optionally, a ruler in Metric or English units may be provided along the edges of the top face 14. Preferably, the bottom face, along its outer, lower edges, has opposed, elongated steps 26 and 28 which run along the length of the bar.

The slide 11 includes a generally flat body member 30, which rests on the top face 14 and carries in a central location, a screw 32 which passes through a threaded opening 34 in the body. The top of the screw has a tab 36 which allows the screw 32 to be manually tightened and loosened. Upon tightening, the screw end 32*a* (FIG. 2) bares against the top face 14 to hold the slide 11 in a selected position along the bar 12. Loosing the screw 32 by grasping the tab 36 and turning, allows the slide 11 to be manually moved lengthwise along the bar 12.

As best illustrated in FIG. 2, there are a pair of opposed arms 38 and 40 extending downwardly from the body 30 which each have therein, respectively, shoulders 42 and 44 that respectively engage the steps 26 and 28. The shoulders 42 and 44 riding along the steps 26 and 28 as the slide 11 moves along the bar 12, serve to guide the slide. The arms 38 and 40 have outer edges 38*a* and 40*a* respectively (FIGS. 3, 6A, 7A, 8A, and 9A) which terminate at a point which is essentially flush with the bottom face 16 of the bar 12, and have at their forward ends, downwardly extending fingers 46 and 48 (FIG. 2) which extend beyond the bottom face of the bar.

Figures 6, 6A:
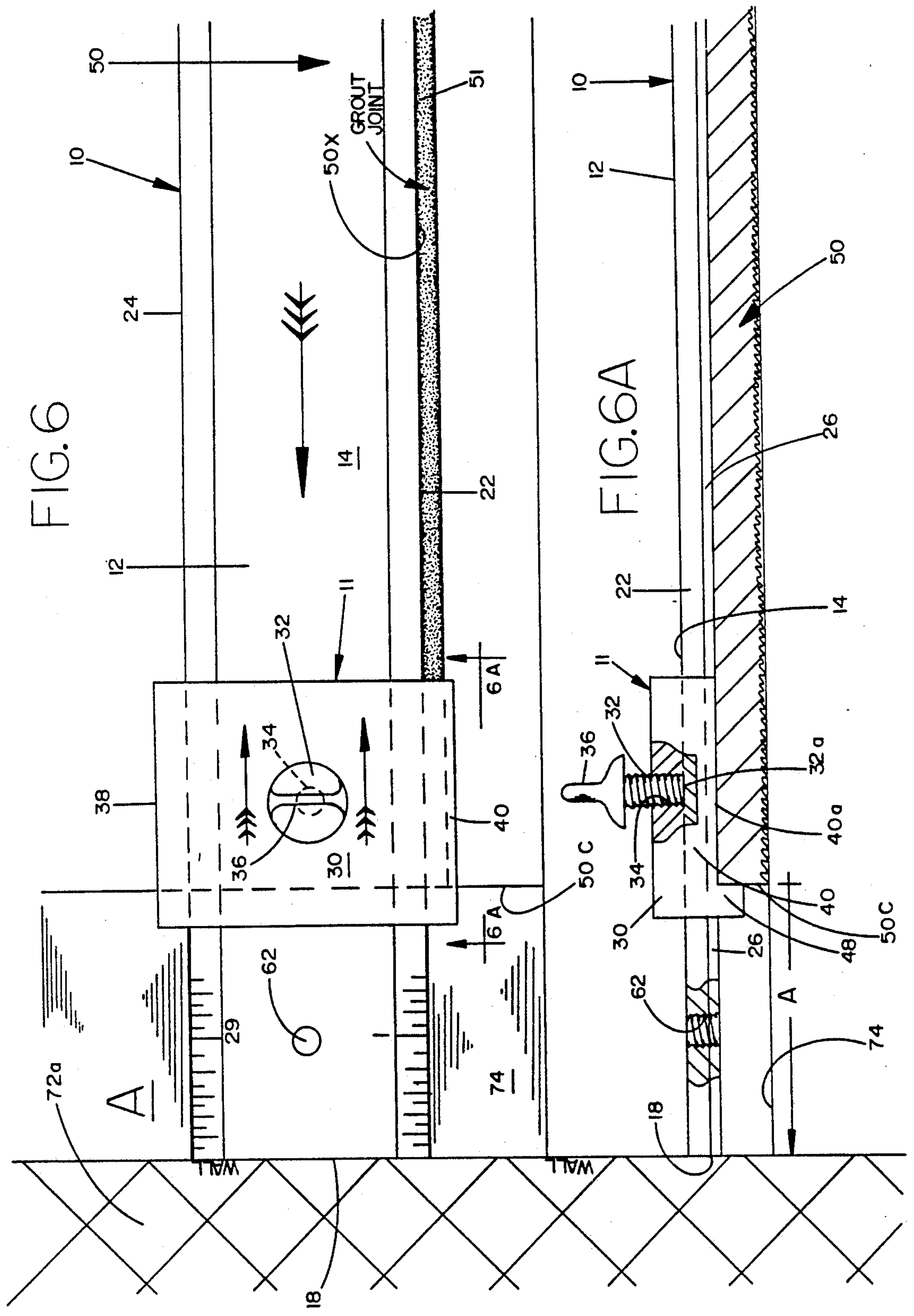
FIG. 6 is a plan view of the tool shown in FIG. 1, overlying a tile installed on a floor which has an adjoining wall.
FIG. 6A is a cross-sectional view taken along line 6A—6A of FIG. 6.
Figures 7, 7A:
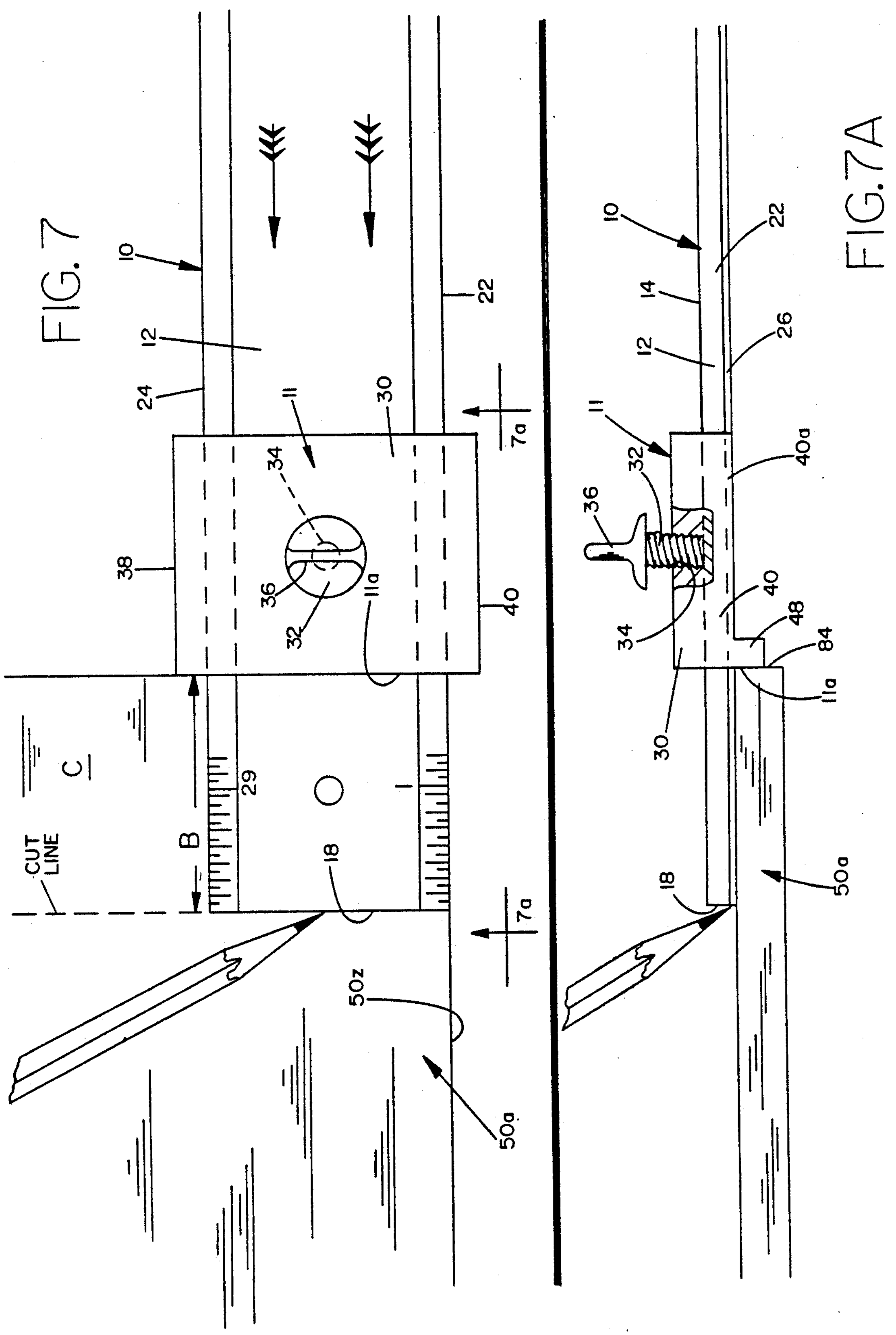
FIG. 7 is a plan view showing the tool used in connection with the installed tile shown in FIGS. 6 and 6A to mark a tile to be cut to provide a tile section which is inserted in the space between the adjoining wall and tile previously installed.

As illustrated in FIGS. 6A and 7A, the height of the finger 46 and 48 is less than the thickness of the tile 50*a* (FIGS. 7A and 9A) being cut. As illustrated in FIG. 3, the thickness (indicated by the letter "X") of each of the fingers 46 and 48 is the same and is a function of the desired grouting space between adjacent tiles. For example, if it is desired that the grouting space be an eighth-of-an-inch, the thickness of each of the fingers 46 and 48 will be one-quarter inch. As will become apparent from the subsequent discussion, this allows for an ⅛ inch spacing around the entire perimeter of the cut section of the tile 50*a*.

Although only one slide 11 is shown, the tool 10 comes with a number of different slides, which are substantially identical, except for a thickness of the fingers 46 and 48. Typically, a tool 10 will use five slides, respectively employing finger thicknesses of one-sixteenth, one-eighth, one-quarter, three-eighths, half-inch, three quarters inch, and one inch thicknesses. These finger thicknesses correspond to the conventional grouting spaces employed.

Figure 4:
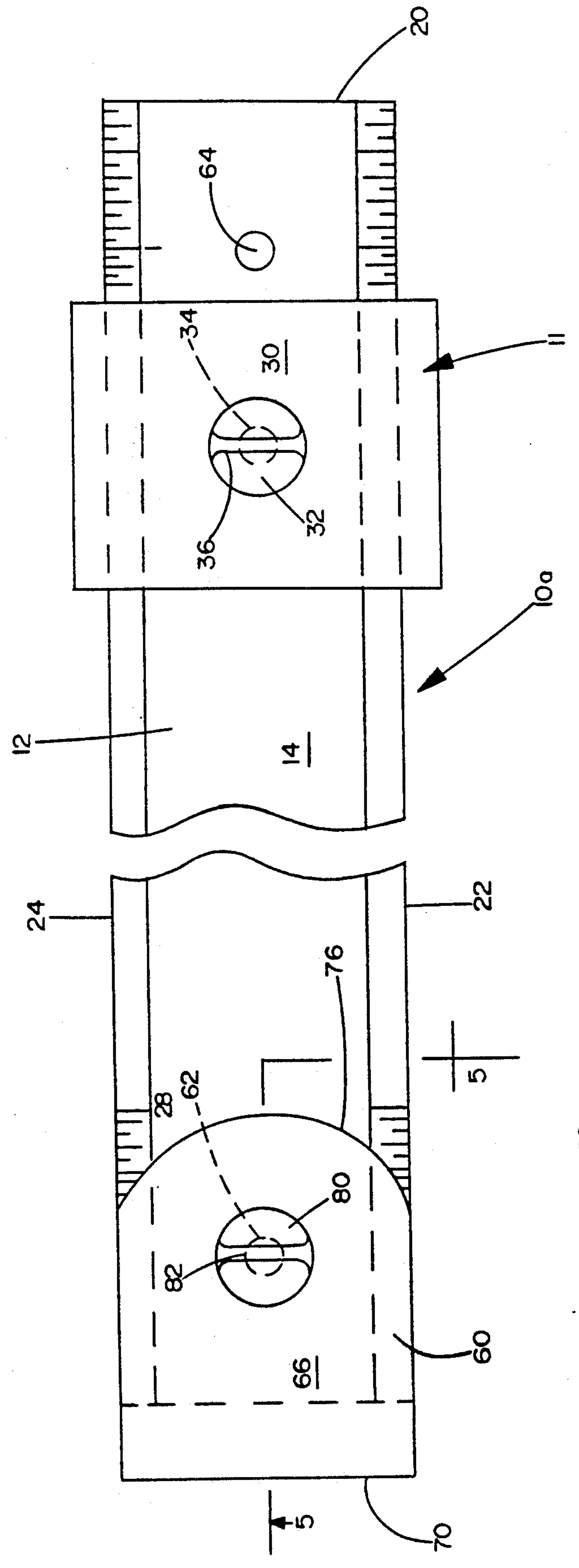
FIG. 4 is a plan view of a second embodiment of the tool of this invention, employing an angle plate, removably attached to an end.
Figure 5:
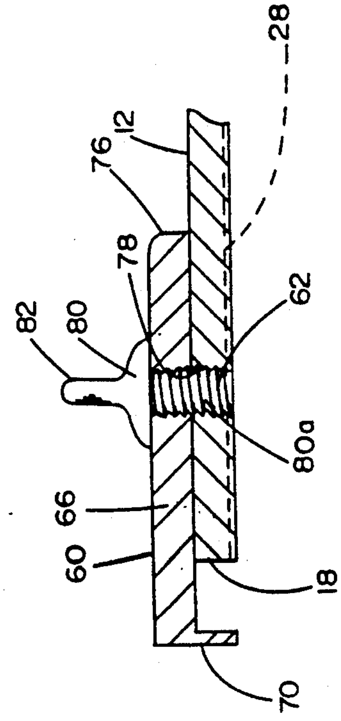
FIG. 5 is a cross-sectional view taken along 5—5 of FIG. 4.
Figure 8:
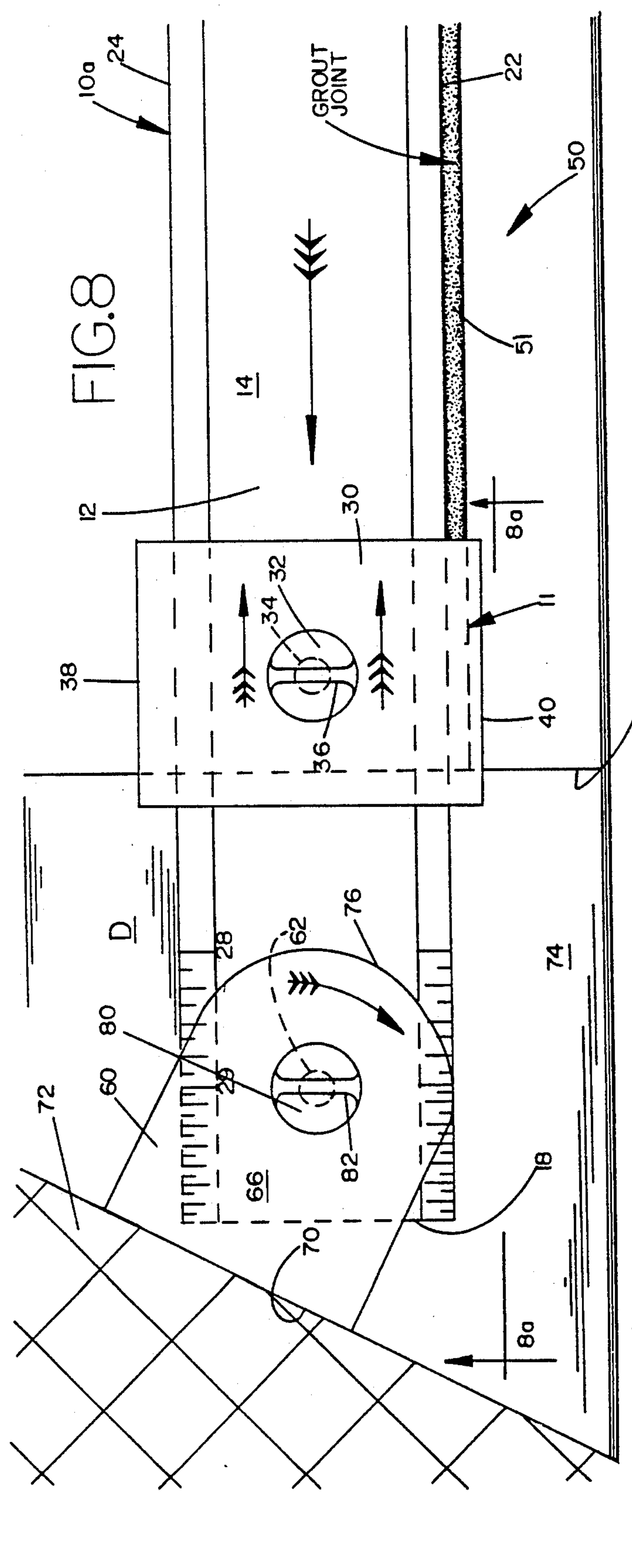
FIG. 8 is a plan view of the second embodiment of this invention being used to install a tile in a space adjacent a wall exposed at an acute angle, with respect to the tiles being installed on an adjoining floor.
Figure 8A:
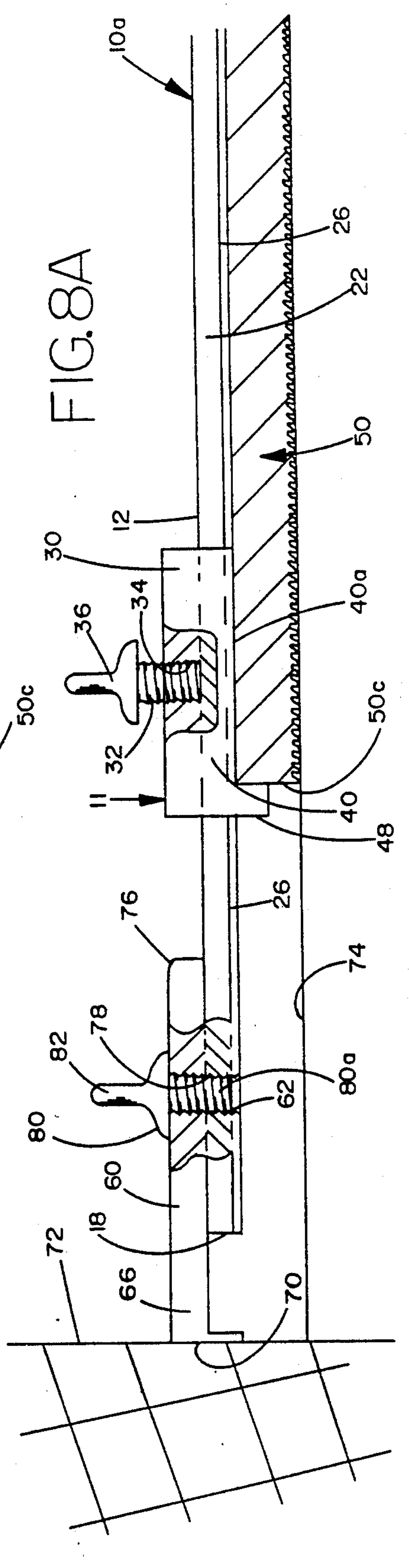
FIG. 8A is a cross-sectional view taken along line 8A—8A of FIG. 8.

FIGS. 4 and 5 illustrate the second embodiment of this invention, tool 10*a*, employing a removable angle plate 60 attached to the one end 18 of the bar 12. Preferably, the bar 12 has two threaded openings 62 and 64, respectively, approximately an inch from each end 18 and 20 of the bar. The angle plate 60 comprises a generally flat top plate 66 having extending beyond and overlapping the end 18 of the bar a generally straight, flat surface 70 which is adapted to abut a wall 72 (FIGS. 8 and 8A) which adjoins the floor 74 on which the tile 50 is being installed. The plate 60 has a curved rear end 76 and is approximately 2½ inches in length and has a non-threaded (smooth) bore 78 in the portion of the top plate 66 overlying the top face 14 of the bar 12. A threaded fastener 80 extends through the bore 78 and is screwed into the threaded hole 62 in the end 18 of the bar 12. The head of the fastener 80 has the tab 82 on it, and, as shown in FIGS. 3 and 8A, the barrel 80*a* of the fastener 80 is shorter than the combined thickness of the bar 12 and top plate 66 so that the barrel 80*a* does not extend through the opening 62 to project beyond the bottom face 16 in the bar 12. With the fastener 80 loosened, the angle plate 60 may be rotated (or pivot) and assumes different angular positions relative to the bar 12.

As illustrated in FIGS. 6 and 6A, the tool 10 is used to mark the location where a tile 50*a* (FIGS. 7 and 7A) is cut to provide a tile section which fits in the space A between the wall 72*a* and tiles 50 already installed on the central area of the floor 74. Typically, in installing tiles, the center of the floor is covered with tiles, which can be rapidly accomplished. Then, the spaces A between adjoining walls 72*a* and the installed tiles 50 are filled by cutting the tiles into sections with the precise dimensions required so the space A is covered by the cut tile section with a surrounding gap for grouting. Without the tool 10, a great deal of time is spent measuring the dimensions, marking the tiles, and then cutting them. The use of this tool substantially reduces the time to mark and cut the tiles.

First, as illustrated in FIGS. 6 and 6A, the tool 10 is placed on the installed tile 50, with the slide 11 loose. Care is taken to locate precisely the tool 10 at a selected reference position on the installed tile 50. As depicted in FIG. 6, this reference position is the edge 50*x* of the installed tile 50 adjacent the grout joint 51. Next, the end 18 of the bar 12 is moved so that it abuts the wall 72*a*. Then the slide 11 is moved in the direction of the edge 50*c* of the installed tile 50 until the fingers 46 and 48 abut the edge 50*c*. The screw 32 is then manually tightened so that the slide 11 is held in a fixed position relative to the bar 12.

As illustrated in FIGS. 7 and 7A, the tool 10 is then placed next to an uncut tile 50*a* in the same relative reference position on the uncut tile 50*a* as it was on the installed tile 50. In this instance with the edge of the bar parallel to the edge 50*z*. It is important that the tool 10 be placed on the uncut tile 50*a* in the same relative position as it was placed on the installed tile 50, otherwise the cut tile section will not fit properly in the space A. The overlapping end portion of the bar 12, the distance B which corresponds to the distance between the wall 72*a* and the end 11*a* of the slide 11, overlying an end portion of the tile 50*a* and the fingers 46 and 48 abutting the edge 84 of this tile. A cut line is then drawn (for example, with a pencil) using the end 18 as a guide to mark the tile 50*a* with a line along which the tile is to be cut. The tile 50*a* is then severed to cut away the end section C, which will then fit in the space A between the wall 72*a* and the previously installed tile 50.

Figures 9, 9A:
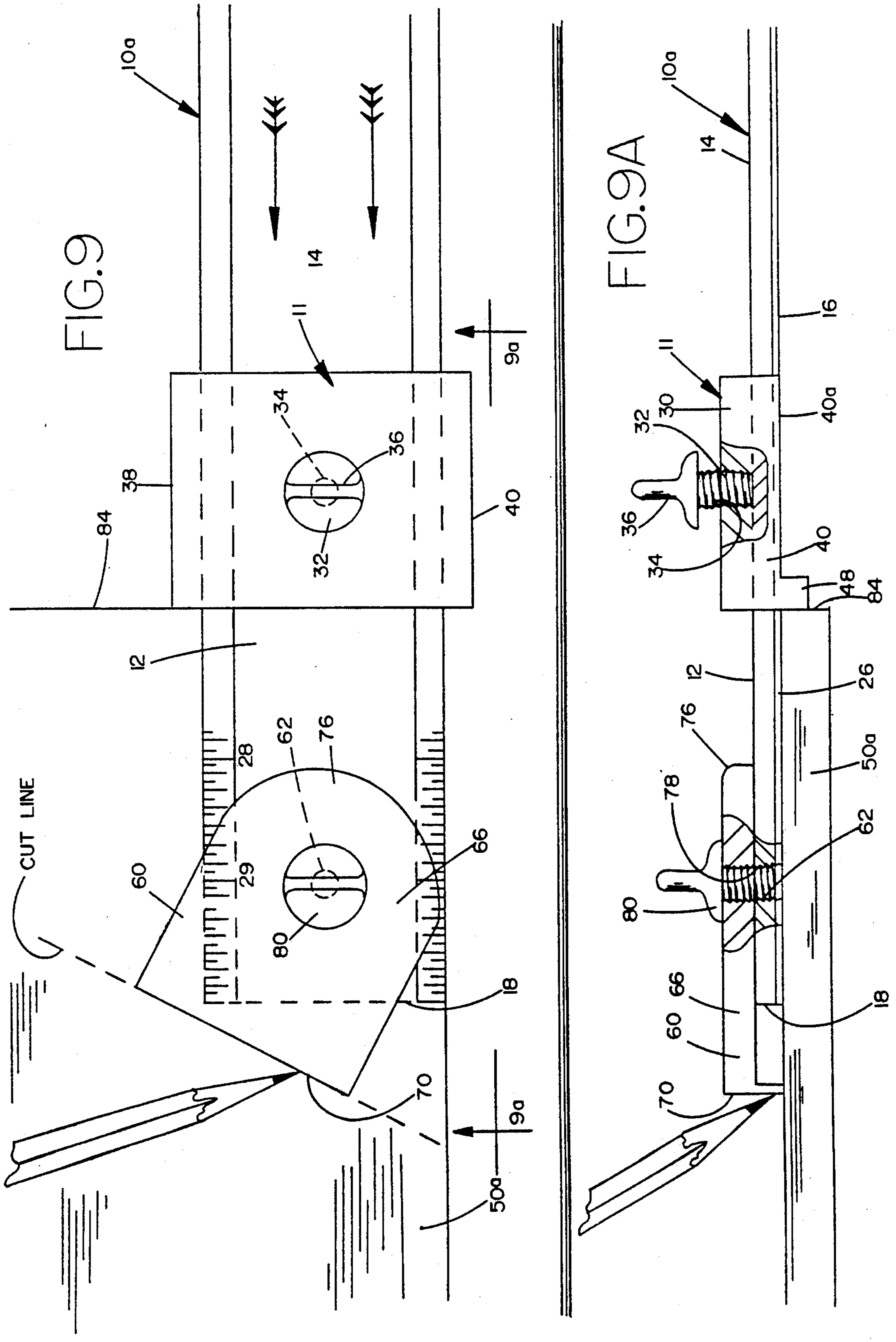
FIG. 9 is a plan view showing the tool used in FIG. 8 to mark a tile to be cut to provide a section to be installed in the space adjacent the wall of FIG. 8.

When an adjoining wall is at an angle with respect to the installed tile 50, the angle plate 60 is used. As depicted in FIGS. 8 and 8A, the angle plate 60 is moved to a position so that the surface 70 abuts the adjoining angular wall 72, and the slide 11 is moved so that the fingers 46 and 48 will abut the edge 50*c* of the installed tile 50. The screw 32 and fastener 80 are then tightened manually, and the tool 10*a* is placed on an uncut tile 50*a* as depicted in FIGS. 9 and 9A with the end portion of the bar 12 extending over the top face 14 of the tile, and the fingers 46 and 48 abutting the edge 84 of the uncut tile 50*a*. A pencil is then used to mark the tile 50*a* by drawing a cut line using the edge of the surface 70 of the angle plate 60 as a guide. The tile 50*a* is then cut along the angular cut line to provide a section which will fit into the space D between the angular wall 72 and the previously installed tiles 50. As discussed above, the tool 10 is placed on the uncut tile 50*a* in the same relative position as it was placed on the installed tile 50 to insure proper fit.

If, for example, it is desired to provide an eighth inch grouting space between the walls 72 and 72*a* and the adjacent, installed tiles 50, a slide 11 with fingers 46 and 48 having a thickness of a $\frac{1}{4}$ is employed. The resulting cut tile section, when placed centrally in the space, for example D, will have a grouting space of an $\frac{1}{8}$ inch between the wall 72 and the contiguous sections of adjoining tiles 50.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. A tool for marking tiles having a predetermined thickness, so that said tiles may be cut precisely to enable said tiles to be placed adjacent each other and spaced apart a predetermined, selected distance, said tool comprising a rectilinear bar having a pair of opposed ends, a pair of opposed sides, and top and bottom opposed faces, a slide element carried by the bar and movable along the length of the bar between said ends, said slide element having a body member which is supported by the top face and has a pair of opposed arms extending along said sides, each of said arms having a finger which extends beyond the bottom face, each of said fingers having a predetermined thickness which facilitates marking and cutting said tile so that, upon installation, adjacent tiles shall be spaced apart said predetermined, selected distance, at least one of said sides having a groove along at least a portion of the length of the bar and at least one of said arms having a guide member which rides in said groove as the slide element slides along the bar, and fastener means for holding the slide element in a selected position along said bar.

2. The tool of claim 1 wherein the finger extend inwardly beneath said bottom face and are of equal thickness.

3. The tool of claim 1 including a plate attached to an end of the bar which has a straight edge and which is movable to different angular positions relative to the bar.

4. A tool for marking tiles having a predetermined thickness, so that said tiles may be cut precisely to enable said tiles to be placed adjacent each other and spaced apart a predetermined, selected distance, said tool comprising a generally flat, elongated, rectilinear bar having a pair of opposed ends, a pair of opposed sides, and generally flat top and bottom opposed faces, a plurality of different sized slide elements, individual ones of said slide elements being adapted to be carried by the bar and movable along the length of the bar between said ends and removed from said bar by sliding off an end, each of said slide elements having a body member which is supported by the top face and has a pair of opposed arms extending along and bearing against said sides which have a height less than the thickness of the tile, each of said arms having a finger which extends beyond the bottom face and inwardly beneath said bottom face, said fingers being of an equal, predetermined thickness which facilitates marking and cutting said tile so that, upon installation, adjacent tiles may be spaced apart said predetermined, selected distance, each of said sides having a groove along at least a portion of the length of the bar and each of said arms having a guide member which rides in a groove as the slide element slides along the bar, and screw type fastener means extending through the body which upon tightening have an end bearing against said top face for holding the slide element in a selected position along said bar.

5. The tool of claim 4 including a plate attached to an end of the bar which has a straight edge and which is movable to different angular positions relative to the bar.

6. A tool for marking tiles having a predetermined thickness, so that said tiles may be cut precisely to enable said tiles to be placed adjacent each other and spaced apart a predetermined, selected distance, said tool comprising a bar having pair of opposed ends, a pair of opposed sides, and top and bottom opposed faces, a slide element carried by the bar and movable along he length of the bar between said ends, said slide element having an arm extending along a side with a finger which extends beyond the bottom face and has a predetermined thickness which facilitates marking and cutting said tile so that, upon installation, adjacent tiles shall be spaced apart said predetermined, selected distance, at least one of said sides having a groove along at least a portion of the length of the bar and at least one of said arms having a guide member which rides in said groove as the slide element slides along the bar, and fastener means for holding the slide element in a selected position along said bar.

7. A method of installing tiles of predetermined thickness on a surface adjoining a wall, comprising (a) laying tiles in a central area of the surface to provide a space between the laid tiles and the adjoining wall which is less than the width of an individual tile, (b) using a tool, marking the tiles to be placed in said floor space so that said tiles may be cut precisely to enable said tiles to be placed adjacent each other and spaced apart a predetermined, selected distance, said tool comprising a rectilinear bar having a pair of opposed ends, a pair of opposed sides, and top and bottom opposed faces, a slide element carried by the bar and movable along the length of the bar between said ends, said slide element having a body member which is supported by the top face and has a pair of opposed arms extending along said sides, each of said arms having a finger which extends beyond the bottom face, each of said fingers having a predetermined thicknesses which facilitates marking and cutting said tile so that, upon installation, adjacent tiles shall be spaced apart said predetermined, selected distance, at least one of said sides having a groove along at least a portion of the length of the bar and at least one of said arms having a guide member which rides in said groove as the slide element slides along the bar, and fastener means for holding the slide element in a selected position along said bar, (c) placing the tool on the laid tiles so that an end of the tool abuts the adjoining wall and a first portion of the bar extends beyond the laid tiles and a second portion of the bar rest on the laid tiles, (d) moving the slide element along the bar so that the fingers engage an edge of the laid tiles and then securing the slide element in this position by manually tightening the fastening means, (e) placing the tool on a tile to be marked and cut in the same relative position as the tool was placed on the laid tile with the first portion of the bar resting on the tile to be marked and cut and the fingers engaging an edge of said tile, (f) with the tool in the position of step (e), marking the tile using the end of said first portion as an indicator, and (g) cutting said tile along the mark and installing the cut tile in said space, adjacent the laid tiles and spaced apart a predetermined, selected distance as determined by the thickness of said fingers.

* * * * *